United States Patent [19]

Jacobson

[11] Patent Number: 5,548,649
[45] Date of Patent: Aug. 20, 1996

[54] NETWORK SECURITY BRIDGE AND ASSOCIATED METHOD

[75] Inventor: Douglas W. Jacobson, Ames, Iowa

[73] Assignee: Iowa State University Research Foundation, Ames, Iowa

[21] Appl. No.: 412,164

[22] Filed: Mar. 28, 1995

[51] Int. Cl.$^6$ .................................................. H04L 9/00
[52] U.S. Cl. ........................... 380/49; 380/4; 380/9; 380/23; 380/25
[58] Field of Search ............................. 380/4, 9, 21, 23, 380/25, 49, 50

[56] References Cited

U.S. PATENT DOCUMENTS

| | | | |
|---|---|---|---|
| 4,731,841 | 3/1988 | Rosen et al. | 380/23 |
| 4,901,348 | 2/1990 | Nichols et al. | 380/6 |
| 4,933,971 | 6/1990 | Bestock et al. | 380/44 |
| 5,056,140 | 10/1991 | Kimbell | 380/23 |
| 5,161,192 | 11/1992 | Carter et al. | 380/48 |
| 5,268,962 | 12/1993 | Abadi et al. | 380/21 |
| 5,386,471 | 1/1995 | Bianco | 380/49 |
| 5,416,842 | 5/1995 | Aziz | 380/4 X |

Primary Examiner—Bernarr E. Gregory
Attorney, Agent, or Firm—Stephen M. Knauer

[57] ABSTRACT

A network local security bridge and corresponding method for bridging a first side of a network and a second side of the network. The first side includes local secure zone host devices within a local secure zone established by the network local security bridge. The second side includes remote secure zone host devices within remote secure zones established by network remote security bridges. The network local security bridge processes a first side data packet received from the first side of the network and a second side data packet received from the second side of the network. In doing so, the network local security bridge encrypts the data frame of the first side data packet when its source and destination addresses respectively specify one of the local secure zone host devices and one of the remote secure zone host devices and leaves the data frame of the first side data packet unchanged when its source and destination addresses respectively specify one of the local secure zone host devices and one of the unsecure host devices. In addition, the network local security bridge decrypts the data frame of the second side data packet when its source and destination addresses respectively specify one of the remote secure zone host devices and one of the local secure zone host devices and leaves the data frame of the second side data packet unchanged when its source and destination addresses respectively specify one of the unsecure host devices and one of the local secure zone host devices. It then transmits the processed first side data packet to the second side and the processed second side data packet to the first side.

12 Claims, 12 Drawing Sheets

Ethernet Protocol Filter Table

| ethernet protocol type |
|---|
| protocol 1 |
| protocol 2 |
| protocol 3 |
| . |
| . |

IP Protocol Filter Table

| IP protocol type |
|---|
| protocol 1 |
| protocol 2 |
| protocol 3 |
| . |
| . |

IP Address Filter Table

| IP address |
|---|
| IP address 1 |
| IP address 2 |
| IP address 3 |
| . |
| . |

Side 2 Ethernet Address Table

| Ethernet address |
|---|
| gateway 106's address |
| bridge 104-2's address |
| bridge 104-3's address |
| host 102-3's address |
| host 102-4's address |
| . |
| . |
| host 102-10's address |

Side 1 Ethernet Address Table

| Ethernet address |
|---|
| host 102-1's address |
| host 102-2's address |

Remote Secure Zone Host I.D. Table

| host IP address | bridge IP address |
|---|---|
| host 102-3's address | bridge 104-2's address |
| host 102-4's address | bridge 104-2's address |
| host 102-5's address | bridge 104-3's address |
| host 102-6's address | bridge 104-3's address |
| host 102-7's address | bridge 104-3's address |

Key Table

| bridge IP address | source key | dest. key |
|---|---|---|
| bridge 104-2's address | key 1 | key 2 |
| bridge 104-3's address | key 3 | key 4 |

Local Secure Zone Host I.D. Table

| host IP address |
|---|
| host 102-1's address |
| host 102-2's address |

Authorization Table — 244

| user i.d. | password | authorization level |
|---|---|---|
| user 1 | password 1 | level 1 (= all bridge management operations) |
| user 2 | password 2 | level 2 (= bridge local & bridge remote operations) |
| user 3 | password 3 | level 3 (= network local & network remote operations) |
| . | . | . |
| . | . | . |
| . | . | . |

Figure 12

NETWORK SECURITY BRIDGE AND ASSOCIATED METHOD

The present invention relates generally to network bridges. Specifically, it relates to a network security bridge.

BACKGROUND OF THE INVENTION

Data encryption and decryption for secure communication between hosts in a network has existed for many years. In these types of networks, each host device is burdened with encrypting outgoing data and decrypting incoming data. Since each host device must be modified in order to perform data encryption and decryption, it is an expensive and cumbersome proposition to establish such a secure network.

Moreover, network bridges for connecting zones or segments of a network have also existed for years. However, these bridges have not been configured to enable secure communication between hosts in different zones or segments. In other words, these bridges do not have the capability of encrypting and decrypting data transmitted from a host in one zone or segment to a host in another zone or segment while allowing unencrypted data to be transmitted locally between hosts in the same zone or segment.

SUMMARY OF THE INVENTION

The foregoing problems are solved by a network local security bridge and corresponding method for bridging a first side of a network and a second side of the network. The first side includes local secure zone host devices within a local secure zone established by the network local security bridge. The second side includes remote secure zone host devices within remote secure zones established by network remote security bridges.

The network local security bridge includes first and second side interface controllers. The first side interface controller receives from the first side of the network a first side data packet and the second side interface controller receives from the second side of the network a second side data packet. The received first and second side data packets each contain a source address, a destination address, and a data frame.

The local network security bridge also includes a data packet processor coupled to the first and second side interface controllers that processes the received first and second side data packets. In doing so, the data packet processor encrypts the data frame of the first side data packet when its source and destination addresses respectively specify one of the local secure zone host devices and one of the remote secure zone host devices. But, the data packet processor leaves the data frame of the first side data packet unchanged when its source and destination addresses respectively specify one of the local secure zone host devices and one of the unsecure host devices. Furthermore, the data packet processor decrypts the data frame of the second side data packet when its source and destination addresses respectively specify one of the remote secure zone host devices and one of the local secure zone host devices. However, the data packet processor leaves the data frame of the second side data packet unchanged when its source and destination addresses respectively specify one of the unsecure host devices and one of the local secure zone host devices.

The second side interface controller transmits the processed first side data packet to the second side. And, the first side interface controller transmits the processed second side data packet to the first side.

BRIEF DESCRIPTION OF THE DRAWINGS

The present invention will be more readily apparent from the following detailed description when read in conjunction with the drawings briefly described hereafter.

FIGS. 5a and 5b show the side 1 and 2 ethernet address tables of the network security bridge of FIG. 2.

FIG. 6 shows the ethernet protocol filter table of the network security bridge of FIG. 2.

FIG. 7 shows the IP protocol filter table of the network security bridge of FIG. 2.

FIG. 8 shows the side 1 and 2 IP address tables of the network security bridge of FIG. 2.

FIG. 9 shows the remote secure zone host identification table of the network security bridge of FIG. 2.

FIG. 10 shows the key table of the network security bridge of FIG. 2.

FIG. 11 shows the local secure zone host identification table of the network security bridge of FIG. 2.

FIG. 12 shows the authorization table of the network security bridge of FIG. 2.

DETAILED DESCRIPTION OF THE INVENTION

Figure 1:
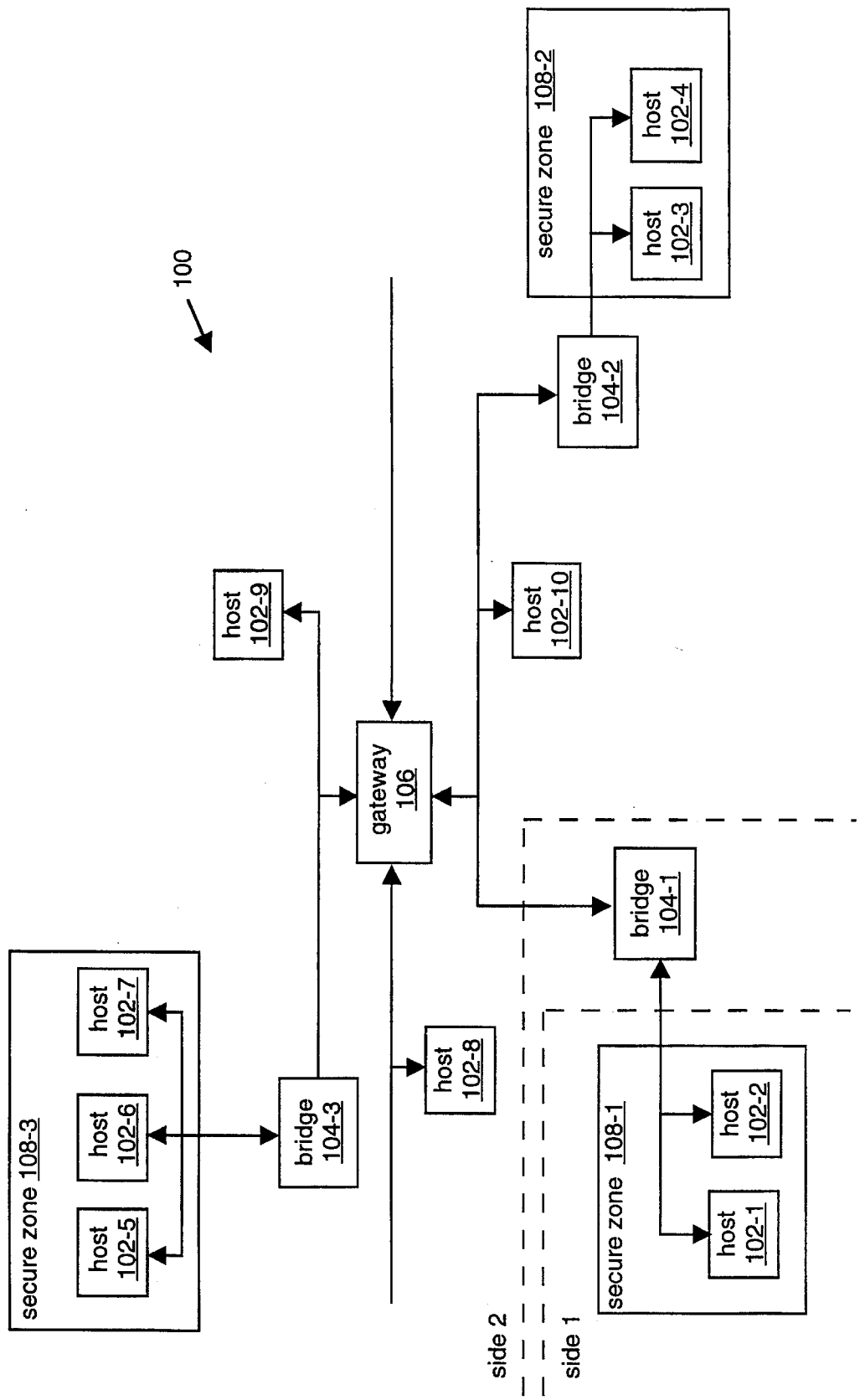
FIG. 1 shows a network in accordance with the present invention.

Referring initially to FIG. 1, there is shown an ethernet network 100. The ethernet network 100 includes various devices such as hosts 102-1 to 102-10, network security bridges 104-1 to 104-3, and gateway 106.

The hosts, bridges, and gateway each have an ethernet address that is unique within ethernet network 100. Moreover, each of the hosts and bridges has an internet protocol (IP) address that is unique within the internet world.

In the network, normal data and bridge management communication is made between and among the hosts, bridges, and the gateway with ethernet data packets. These data packets include an ethernet header and an ethernet data frame. The ethernet header includes an ethernet source address, an ethernet destination address, and an ethernet protocol identifier. The ethernet data frame includes an IP header and an IP data frame or portion. The IP header includes an IP source address, an IP destination address, and an IP protocol identifier. The IP data frame includes the data that is to be communicated.

The gateway 106 is a conventional IP gateway and routes data packets to the hosts or bridges. The gateway receives data packets whose ethernet destination address is the ethernet address of the gateway. It then replaces the ethernet source address with its ethernet address and replaces the ethernet destination address with the ethernet address of whichever of the hosts or bridges is specified by the IP destination address contained by the received data packet.

The hosts 102-1 to 102-12 may be personal computers, mainframes, time sharing systems, super computers, work stations, file servers, printers, storage devices or other data processing or handling devices. Each of the hosts includes an ethernet network interface for communicating with each other, the bridges, and the gateway. In addition, each of the hosts includes a network operating system used in conjunction with the interface for handling normal data communication. And, some of the hosts may include a bridge management system used in conjunction with the interface for managing the bridges in the way described later.

The network operating systems employed by the hosts may be different from one another and as a result may involve different types of protocols for data communication. For example, some of the hosts may run Novell's IPX/SPX network operating system, while others may run Unix's TCP/IP network operating system, and yet still others may run Digital's DECnet network operating system. Moreover, as indicated earlier, some of the hosts may run a bridge management system that uses the Simple Network Management Protocol (SNMP). The types of ethernet and IP protocols used by the hosts will be identified in the ethernet and IP protocol identifiers of the data packets generated by them.

As will be described later, the bridges 104-1 to 104-3 include encryption and decryption software and/or hardware so that normal data communication and bridge management communication between secure zones 108-1 to 108-3 is made by encrypting and decrypting the IP data frame in the transmitted or received data packet. Thus, the hosts 102-1 to 102-10 need not include software and/or hardware for encrypting and decrypting data for normal data communication between each other. Moreover, those of the hosts that are authorized for bridge management need not include software and/or hardware for encrypting and decrypting data for bridge management communication with the bridges.

For convenience, the configuration and the bridging and bridge management operations of bridge 104-1 with respect to bridges 104-2 and 104-3 will be described hereafter. However, one skilled in the art will appreciate that the configuration, functions, and operations of bridges 104-2 and 104-3 are similar.

The bridge 104-1 bridges side 1 and side 2 of the network 100 and establishes the secure zone or segment 108-1. Side 1 includes the hosts 102-1 and 102-2 and the secure zone 108-1. Side 2 includes the hosts 102-3 to 102-10, the gateway 106, the bridges 104-2 and 104-3, and the secure zones 108-2 and 108-3 respectively established by the bridges 104-2 and 104-3.

With respect to bridge 104-1, the bridges 104-2 and 104-3 are remotely coupled to it and remotely establish the secure zones 108-2 and 108-3, respectively. Moreover, bridge 104-1 itself locally establishes the secure zone 108-1. Thus, the bridge 104-1 is considered a network local security bridge and the secure zone 108-1 is considered a local secure zone while the bridges 104-2 and 104-3 are considered network remote security bridges and the secure zones 108-2 and 108-3 are considered remote secure zones.

Within remote secure zone 108-2 are the hosts 102-3 and 102-4 which are remotely coupled to the bridge 104-1 and are therefore considered remote secure zone hosts. Moreover, since the hosts 102-5 to 102-7 are remotely coupled to the bridge 104-1 and are within the remote secure zone 108-3, they are also considered remote secure zone hosts.

The hosts 102-8 to 102-10 are coupled to the bridge 104-1 and are not within a secure zone. Therefore, they are considered unsecure hosts.

BRIDGING OPERATION

Figure 2:
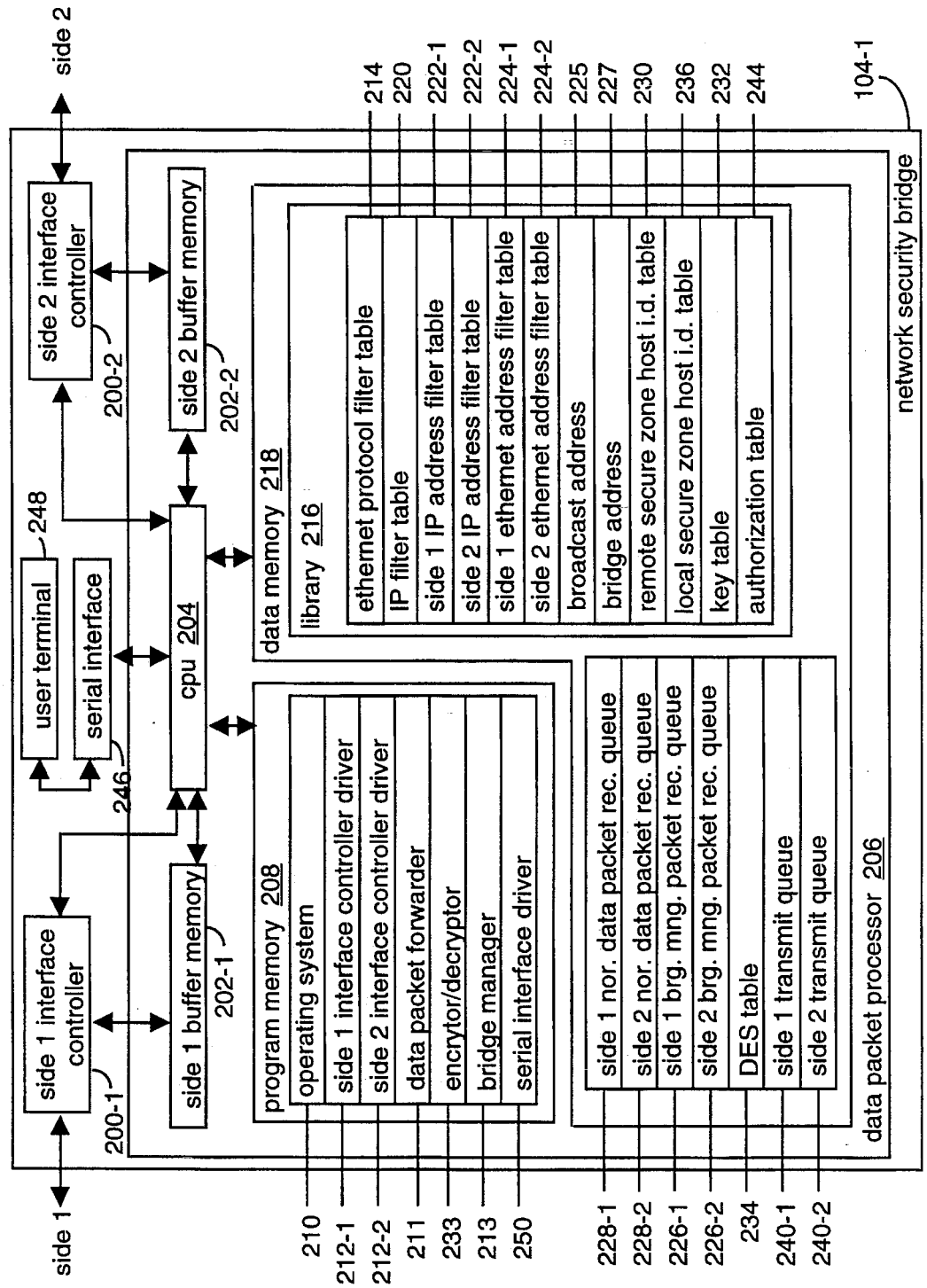
FIG. 2 is a block diagram of a network security bridge in accordance with the present invention.

FIG. 2 shows the detailed configuration of network local security bridge 104-1. Moreover, FIG. 3 shows the general flow of operation of the bridge in bridging sides 1 and 2.

Figure 3:
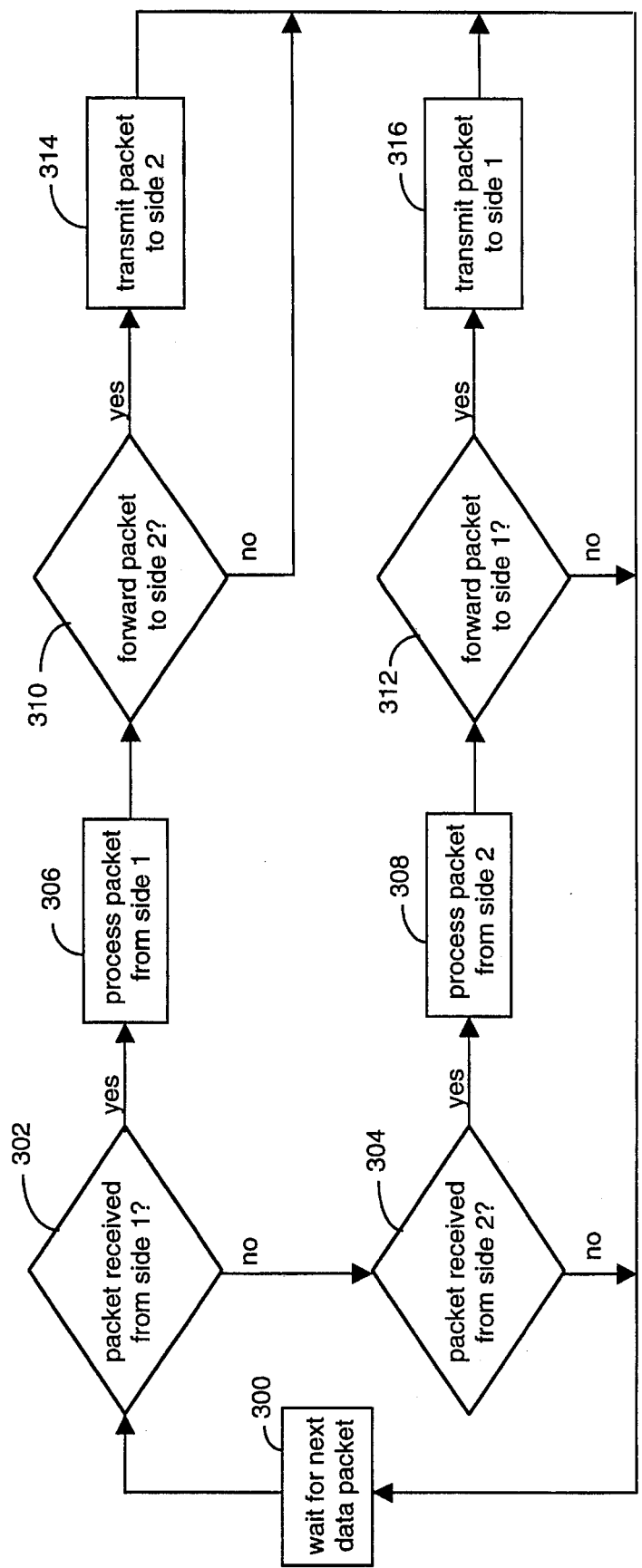
FIG. 3 shows the flow of operation of the network security bridge of FIG. 2 in receiving and processing data packets.

Referring to FIGS. 2 and 3, the bridge waits until a data packet is received by the side 1 or 2 interface controller (or adapter) 200-1 or 200-2 (block 300 of FIG. 3). When one of the interface controllers does receive a data packet, it stores the data packet in the corresponding side 1 or 2 buffer memory 202-1 or 202-2 of the data packet processor 206. It then generates a corresponding side 1 or 2 receive interrupt and sends it to the CPU 204 of the data packet processor along with the address at which the data packet is stored in the corresponding buffer memory. In the preferred embodiment, the interface controllers are conventional DP83932 Systems Oriented Network Interface Controllers (SONICs) by National Semiconductor.

The program memory 208 of the data packet processor stores the bridge operating system 210 which is run by the CPU 204. The operating system provides an interface between the side 1 and 2 interface controller drivers 212-1 and 212-2 and the data packet forwarder 211, between the side 1 and 2 drivers and the bridge manager 213, and between the serial interface driver 248 and the bridge manager. In the preferred embodiment, the operating system is OS-9 by Microware Systems, Inc. The operating system determines whether the data packet was received from side 1 or 2 based on the side 1 or 2 receive interrupt which it receives (blocks 302 and 304 of FIG. 3). Then, the received data packet is processed by the data packet processor in accordance with whether it was received from side 1 or 2 (blocks 306 and 308 of FIG. 3).

Referring to FIGS. 2 and 4a–4c, this processing begins when the operating system 210 calls up the side 1 or 2 driver 212-1 or 212-2 based on its determination of whether the data packet was received from side 1 or 2. The operating system also provides this driver with the pointer to where (i.e., the address at which) the received data packet is stored in the corresponding side 1 or 2 buffer memory 202-1 or 202-2 so that the driver can perform initial processing of the received data packet. The side 1 and 2 drivers are stored in the program memory 208 and run by the CPU 204.

As shown in FIGS. 5a and 5b, the bridge 104-1 has a structured data library 216 that includes side 1 and 2 ethernet address tables 224-1 and 224-2. The side 1 ethernet address table 224-1 contains the ethernet addresses of the hosts 102-1 and 102-2 on side 1 to which a data packet received from side 2 may be transmitted or from which a data packet can be received. Similarly, the side 2 ethernet address table 224-2 contains the ethernet addresses of the hosts 102-3 and 102-4, bridges 104-2 and 104-3, and gateway 106 on side 2 to which a data packet received from side 1 may be transmitted or from which a data packet can be received.

Turning again to FIGS. 2 and 4a–4c, after the driver is called up, it parses the ethernet source and destination addresses in the received data packet by retrieving them from the buffer memory in which the received data packet is stored using the pointer to the received data packet (block 400 of FIG. 4a). Then, the driver determines if the parsed ethernet source address is contained in the ethernet address table for the side from which the data packet was received (i.e., receive side) (decision block 402 of FIG. 4a). The library is created and stored in the data memory 218 of the data packet processor 206.

Figure 4A:
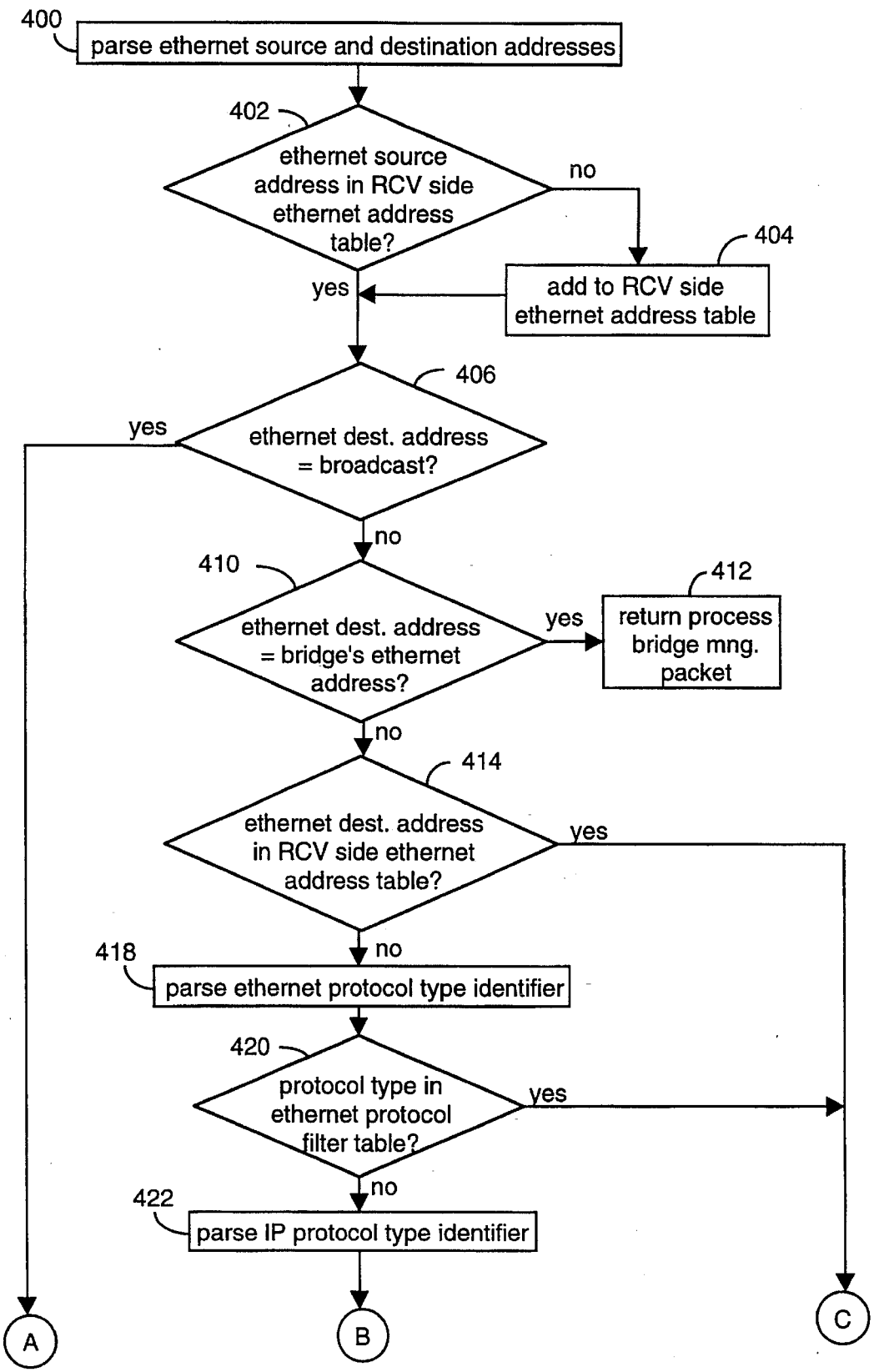
FIGS. 4a–4c show the detailed flow of operation of the network security bridge of FIG. 2 in processing received data packets.

If the receive side ethernet address table does not contain the parsed ethernet source address, then the driver adds the parsed ethernet source to it (block 404 of FIG. 4a). Thus, the side 1 and 2 drivers 212-1 and 212-2 through a self learning process determine that hosts 102-1 and 102-2 have ethernet addresses on side 1 and that hosts 102-3 and 102-4, bridges 104-2 and 104-3, and gateway 106 have ethernet addresses on side 2.

Once the parsed ethernet source address has been added to the receive side ethernet address table or once it is determined that the parsed ethernet source address is in the receive side ethernet address table, the driver determines if the parsed ethernet destination address specifies the standard predefined ethernet broadcast address (decision block 406 of FIG. 4a). The broadcast address signifies that the received data packet is to be broadcast to all devices on the network. If the broadcast address is specified by the parsed ethernet destination address, then the driver returns control to the operating system 210, alerts the operating system that the received data packet has been processed and is to be forwarded to the side opposite from where it was received, and also passes to the operating system the pointer to the received data packet (block 408 of FIG. 4c).

Figure 4B:
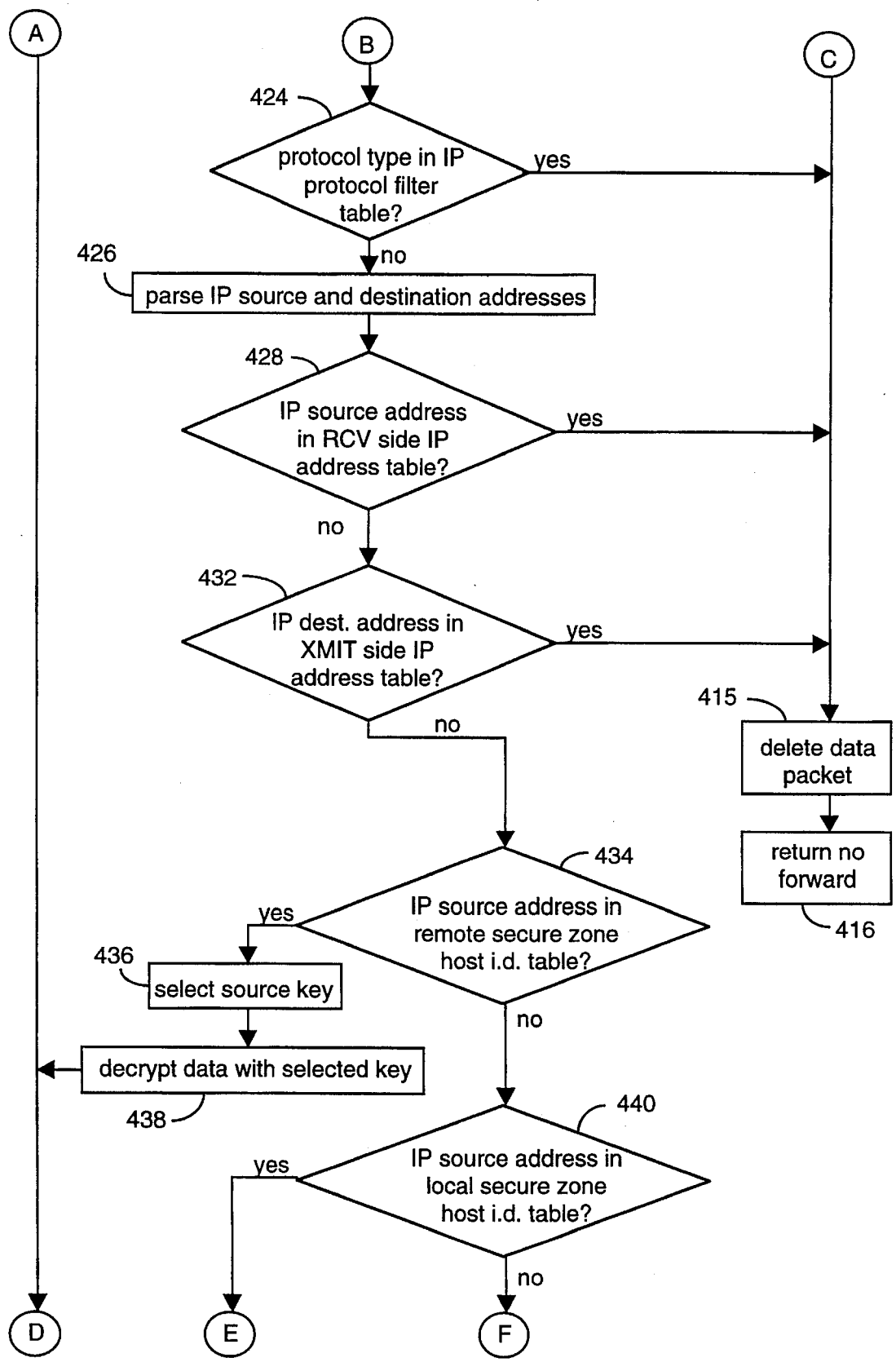

However, if the parsed ethernet destination address does not specify the broadcast address, then the driver determines if the parsed ethernet destination address specifies the predefined ethernet bridge address 227 of bridge 104-1 contained in the library 216 (decision block 410 of FIG. 4b). The predefined ethernet bridge address is established and updated using the bridge management operations described later.

If the parsed ethernet destination address does match the predefined ethernet bridge address, then this indicates that the received data packet is a bridge management packet and is to be further processed by the bridge manager 213. As a result, the driver places the pointer to the received data packet in the corresponding side 1 or 2 bridge management packet receive queue 226-1 or 226-2 in the data memory 218. Once this has been done, it alerts the operating system 210 that a bridge management packet has been received and should be further processed by the bridge manager (block 412 of FIG. 4a).

But, if the parsed ethernet destination address does not specify the predefined ethernet address of bridge 104-1, then this means that the received data packet is a normal data packet and should be further processed by the driver. The driver then determines if the parsed ethernet destination address is contained in the ethernet address table 224-2 or 224-1 for the side from which the data packet was received (i.e., RCV side) (decision block 414 of FIG. 4a). If it is, then the driver deletes (i.e., filters) the data packet from the buffer memory in which it is stored (block 415 of FIG. 4b) and returns control to the operating system without alerting it that the received data packet is to be further processed or forwarded (block 416 of FIG. 4b).

But, if the parsed ethernet destination address is not contained in the ethernet address table for the side from which the data packet was received, the driver parses the ethernet protocol identifier in the received data packet (block 418 of FIG. 4a). The driver does this by retrieving the ethernet protocol identifier from the buffer memory in which the received data packet is stored using the pointer to the received data packet. The driver then determines if the ethernet protocol type identified by the parsed ethernet protocol identifier is contained in the ethernet protocol filter table 214 of the library 216 (decision block 420 of FIG. 4a).

Referring to FIG. 6, the ethernet protocol filter table contains the ethernet protocol types for which a received data packet is to be filtered. The ethernet protocol types listed in the ethernet protocol table are selected using the bridge management operations discussed later.

Referring to FIGS. 2 and 4a–4c, if the ethernet protocol type of the received data packet is listed in the ethernet protocol filter table, then the driver deletes the received data packet from the buffer memory in which it is stored (block 415 of FIG. 4b) and returns control to the operating system without alerting it that the received data packet is to be further processed or forwarded (block 416 of FIG. 4b).

The data packet processor 206 includes side 1 or 2 normal data packet receive queues 228-1 and 228-2 in the data memory 218. Thus, when the ethernet protocol type identified by the parsed ethernet protocol identifier is not contained in the ethernet protocol filter table, then the driver places the pointer to the received data packet in the receive queue for the side. It then alerts the operating system 210 that a normal data packet has been received and should be further processed by the data packet forwarder 211.

Other received data packets, whose pointers were placed earlier in the normal data packet receive queue 228-1 or 228-2, are processed by the data packet forwarder before the current data packet is processed. Once these other data packets have been processed, the operating system calls up the data packet forwarder and takes from the appropriate normal data packet receive queue the pointer to the current data packet and passes it to the data packet forwarder.

The data packet forwarder then parses the IP protocol identifier in the received data packet by retrieving it from the buffer memory in which it is stored using the provided pointer to the received data packet (block 422 of FIG. 4a). After this has been done, the data packet forwarder determines if the IP protocol type identified by the parsed IP protocol identifier is contained in the IP protocol filter table 220 of the bridge library 216 (decision block 424 of FIG. 4b).

Referring to FIG. 7, the IP protocol filter table 220 contains the IP protocol types for which a received data packet is to be filtered. Like the ethernet protocol types listed in the ethernet protocol filter table 214, the IP protocol types listed in the IP protocol table are selected using the bridge management operations discussed later.

Referring back to FIGS. 2 and 4a–4c, if the IP protocol type of the received data packet is listed in the IP protocol filter table, the data packet forwarder deletes the received data packet from the buffer memory in which it is stored and its pointer in the normal data packet receive queue (block 415 of FIG. 4b). It then returns control to the operating system 210 without alerting the operating system that the received data packet is to be forwarded (block 416 of FIG. 4b).

Referring to FIG. 8, the library 216 has an IP address filter table 222. The IP address filter table contains the IP addresses of the hosts and/or bridges for which data packets are to be filtered.

Turning again to FIGS. 2 and 4a–4c, if the IP protocol type identified by the parsed IP protocol identifier is not contained in the IP protocol filter table, then the data packet forwarder parses the IP source and destination addresses in the received data packet by retrieving them from the buffer memory in which the received data packet is stored using the provided pointer to the received data packet (block 426 of FIG. 4b). Once this is done, the data packet forwarder determines if the parsed IP source address is contained in the IP address filter table (decision block 428 of FIG. 4b).

After it is determined that the parsed IP source address is not in the IP address filter table, the data packet forwarder determines if the parsed IP destination address is contained in the IP address filter table (decision block 432 of FIG. 4a). If it is, the data packet forwarder deletes the received data packet from the buffer memory in which it is stored and its pointer in the normal data packet receive queue (block 415 of FIG. 4b). It then returns control to the operating system 210 without alerting the operating system that the received data packet is to be forwarded (block 416 of FIG. 4b).

But, if the parsed IP destination address is not contained in the IP address filter table, then the data packet forwarder determines if the parsed IP source address specifies the IP address of one of the remote secure zone hosts 102-3 to 102-7 identified in the remote secure zone host identification table 230 of the library 216 (decision block 434 of FIG. 4b).

Referring to FIG. 9, the identification table 230 contains the IP addresses of all of the remote secure zone hosts 102-3 to 102-7. Each IP address is mapped to the IP address of the corresponding network remote security bridge 104-2 or 104-3 that establishes the remote secure zone 108-1 or 108-2 within which is the particular remote secure zone host specified by the IP address. The identification table may be established or updated using the bridge management operations described later.

Turning back to FIGS. 2 and 4a–4c, if the identification table does contain the parsed IP source address, this means that the received data packet is from one of the remote secure zones and its IP data frame has been encrypted by the corresponding network remote security bridge. By this point, the data packet forwarder will have already determined that the received data packet has an IP destination address that specifies one of the local secure zone hosts 102-1 or 102-2 (decision block 432 of FIG. 4b). As a result, the data packet forwarder selects a source key from the key table 232 in the library 216 for decrypting the IP data frame of the received data packet (block 436 of FIG. 4b).

As shown in FIG. 10, the key table contains the IP address of each of the network remote security bridges 104-2 and 102-3. Moreover, for each of the IP addresses of the network remote security bridges, the key table 232 contains a corresponding source key and a corresponding destination key. The key table is established and updated using the bridge management operations described later.

Referring again to FIGS. 2 and 4a–4c, the data packet forwarder 211 selects the source key by first identifying from the identification table 230 the IP address of the network remote security bridge that establishes the remote secure zone which contains the remote secure zone host specified by the parsed IP source address. Then, it selects the source key in the key table 232 that corresponds to the network remote security bridge that it just identified.

After the source key has been selected, the data packet forwarder calls up the encryptor/decryptor 233 and passes to it the pointer to the received data packet. The encryptor/decryptor in response decrypts the IP data frame of the received data packet with the selected source key using the DES table 234 contained in the library 216 in accordance with known DES encryption/decryption techniques (block 438 of FIG. 4b).

The encryptor/decryptor then alerts the data packet forwarder that the IP data frame of the received data packet has been decrypted. The data packet forwarder then returns control to the operating system 210, alerts the operating system that the received data packet has been processed and is to be forwarded to the side opposite from where it was received, and also passes to the operating system the pointer to the received data packet (block 408 of FIG. 4c).

But, if the remote secure zone host identification table 230 does not contain the parsed IP source address of the received data packet (decision block 434 of FIG. 4b), then the data packet forwarder determines if the parsed IP source address specifies one of the IP addresses contained in the local secure zone host identification table 236 of the library 216 (decision block 440 of FIG. 4b).

As shown in FIG. 11, the identification table 236 contains the IP addresses of the local secure zone hosts 102-1 and 102-2 within the local secure zone 108-1 established by the network local security bridge 104-1. The identification table 236 is also established and updated using the bridge management operations described later.

Referring again to FIGS. 2 and 4a–4c, if the parsed IP source address does not specify one of the IP addresses of the local secure zone hosts, then this means that the parsed IP source address specifies one of the unsecure hosts 102-8 to 102-10 and the data of the received data packet is not encrypted. As a result, the data packet forwarder leaves the IP data frame unchanged, returns control to the operating system 210, alerts the operating system that the received data packet has been processed and is to be forwarded to the side opposite from where it was received, and also passes to the operating system the pointer to the received data packet (block 408 of FIG. 4c).

Figure 4C:
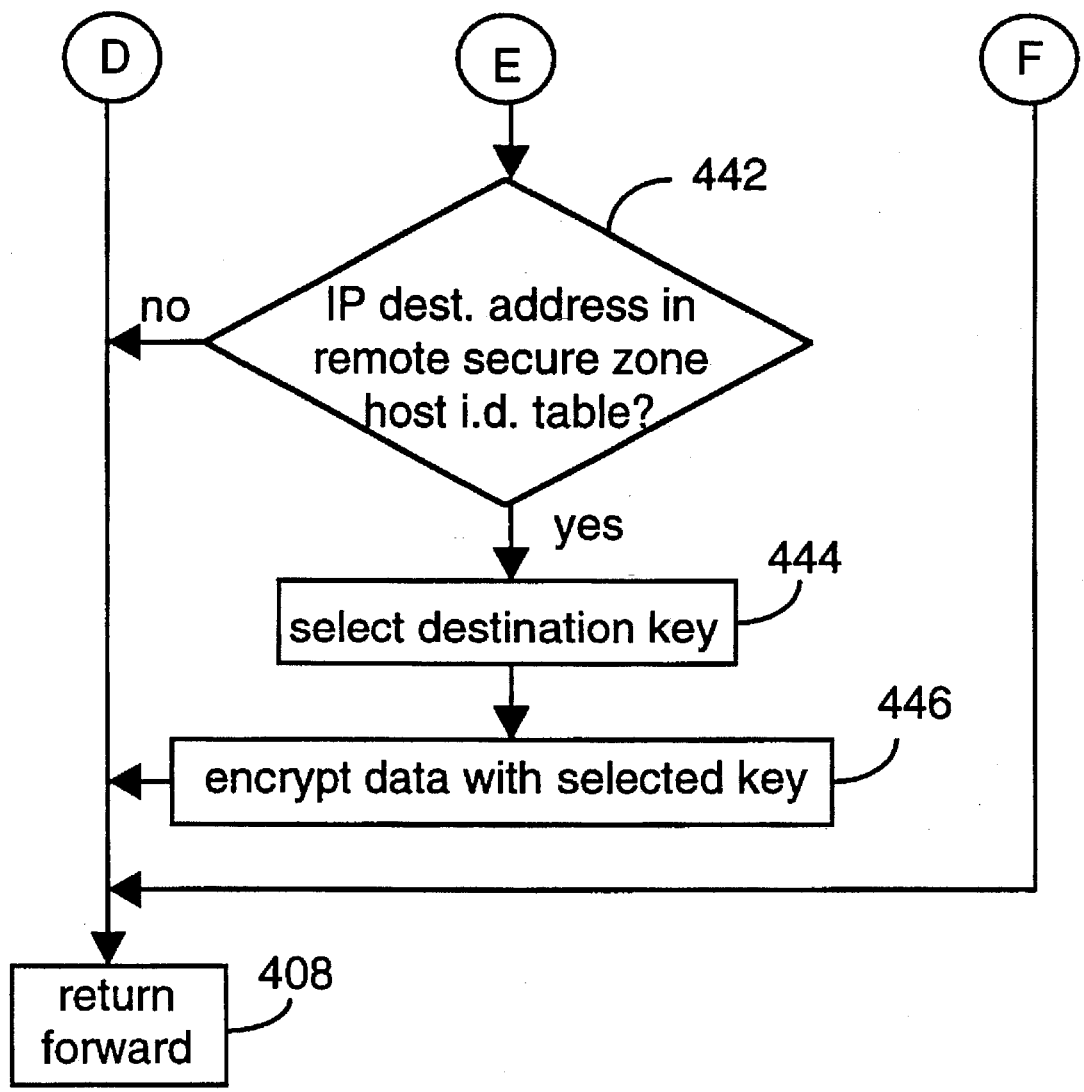

But, if the parsed IP source address does specify one of the IP addresses of the local secure zone hosts, then the data packet forwarder determines if the parsed IP destination address specifies one of the IP addresses contained in the local secure zone host identification table 236 of the library 216 (decision block 44 of FIG. 4c). If it does not, then this means that the IP destination address specifies one of the unsecure hosts 102-8 to 102-10. As a result, the data packet forwarder leaves the IP data frame unchanged and alerts the operating system that the received data packet has been processed and is to be forwarded to the side opposite from where it was received and also passes back to the operating system the pointer to the received data packet (block 408 of FIG. 4c).

If the parsed IP destination address does specify one of the IP addresses in the identification table 236, then the data packet forwarder selects a destination key from the key table 232 for encrypting the unencrypted IP data frame of the received data packet (block 444 of FIG. 4c). In selecting the destination key, the data packet forwarder first identifies from the identification table 230 the IP address of the network remote security bridge that establishes the remote secure zone which contains the remote secure zone host specified by the parsed IP destination address. Then, it selects the destination key in the key table that corresponds to the identified network remote security bridge.

The data packet forwarder then calls up the encryptor/decryptor 233. At the same time, it passes to the encryptor/decryptor the pointer to the received data packet. In response, the encryptor/decryptor then encrypts the IP data frame of the received data packet with the selected destination key using the DES table 234 (block 446 of FIG. 4c).

The encryptor/decryptor then alerts the data packet forwarder 211 that the IP data frame of the received data packet has been encrypted. The data packet forwarder then returns control to the operating system 210, alerts the operating system that the received data packet has been processed and is to be forwarded to the side opposite from where it was received, and also passes to the operating system the pointer to the received data packet (block 408 of FIG. 4c).

Turning to FIGS. 2 and 3, when control is returned to the operating system 210 without being alerted that the processed data packet is to be forwarded (decision blocks 314 and 316 of FIG. 3), then it waits (block 300 of FIG. 3) until one of the interface controllers 200-1 or 200-2 receives the next data packet (block 302 of FIG. 3). In this case, the process just described is repeated for this next data packet.

The data packet processor 206 includes side 1 or 2 transmit queues 240-1 and 240-2 in the data memory 218. Thus, when control is returned to the operating system and it is alerted that the received data packet has been processed and is to be forwarded (decision blocks 314 and 316), then it places the pointer to the processed data packet in the transmit queue for the side to which the processed data packet is to be transmitted (i.e., the side opposite from which it was received).

After other data packets whose pointers were placed earlier in the transmit queue are handled for transmission, the operating system 210 calls up the appropriate driver 212-1 or 212-2 for handling the transmission of the processed data packet. In doing so, the operating system passes to the driver the pointer to the processed data packet.

In response, the driver sends a transmit signal from the CPU 204 to the corresponding interface controller 200-1 or 200-2 along with the pointer to the processed data packet. The interface controller retrieves the processed data packet from the corresponding buffer memory 202-1 or 202-2 using the provided pointer to the processed data packet and then transmits the processed data packet to the corresponding side 1 or 2 (blocks 318 and 320 of FIG. 3).

The interface controller that transmitted the processed data packet then sends to the CPU 204 a signal indicating that the processed data packet has been transmitted. The operating system 210 then alerts the driver that the processed data packet has been transmitted. In response, the driver deletes the packet from the buffer memory in which the processed data packet was stored using the pointer to the processed data packet.

BRIDGE LOCAL MANAGEMENT

Bridge local management involves installing (i.e., replacing) or viewing one of the items contained in the library 216 of bridge 104-1 using the user terminal 246. Turning to FIGS. 5-12, specifically it involves installing or viewing a protocol in table 214 or 220, an address in table 222-1, 222-2, 224-1, 224-2, 230, 232, or 236, the predefined bridge address 227, a key in table 232, or a user i.d., password, or authorization level in authorization table 244.

Referring again to FIG. 2, the user terminal enables a user to issue commands for performing bridge local management operations on local bridge 104-1. The bridge local management commands issued by the user contain (A) information indicating that an item is to be installed or viewed, (B) the user's i.d., (C) the user's password for accessing the local bridge to install or view an item, (D) installment or viewing information necessary for identifying the location in the library 216 where the item is to be installed or viewed, and in the case of installing an item, (E) the item to be installed, and (F) the user's password for accessing a remote bridge to distribute the installed item.

The bridge local management commands are received by the serial interface 248 of the bridge 104-1. Upon receiving each command, the serial interface controller generates receive interrupts provided to the CPU 204. In response, the operating system 210 calls up the serial interface driver 250 and alerts it whenever one of these commands has been received by the serial interface. The serial interface driver is stored in the program memory 208 and run by the CPU 204.

The serial interface driver alerts the operating system each time one of the commands is received. Whenever this occurs, the operating system calls up the bridge manager 213 and instructs the serial interface driver to retrieve the command from the serial interface. The serial interface driver then retrieves the command and provides it to the CPU. The bridge manager then processes the command.

From the information provided by the commands issued with the user terminal, the bridge manager determines that the user seeks to perform a bridge local install or view operation. After determining this, the bridge manager determines whether the user is authorized to perform the bridge local install or view operation. This is done by comparing the user's i.d. and password for accessing local bridge 104-1 with those stored in the authorization table 244 and looking up the user's authorization level in the authorization table 244.

If the operation is a local view operation and the user is authorized to perform this operation, then the bridge manager retrieves the item from the library 216 using the viewing information and generates a signal containing the item which is sent from the CPU to the serial interface. The bridge manager then alerts the operating system which calls up the serial interface driver. The serial interface driver then instructs the serial interface to transmit the signal to the user terminal. In response, the user terminal displays the item for the user.

However, if the operation is a local install operation and the user is authorized to perform this operation, then the bridge manager installs in the library 216 the item contained in the commands issued with the user terminal. It does so using the installment information provided by the commands issued with the user terminal.

Figure 13:
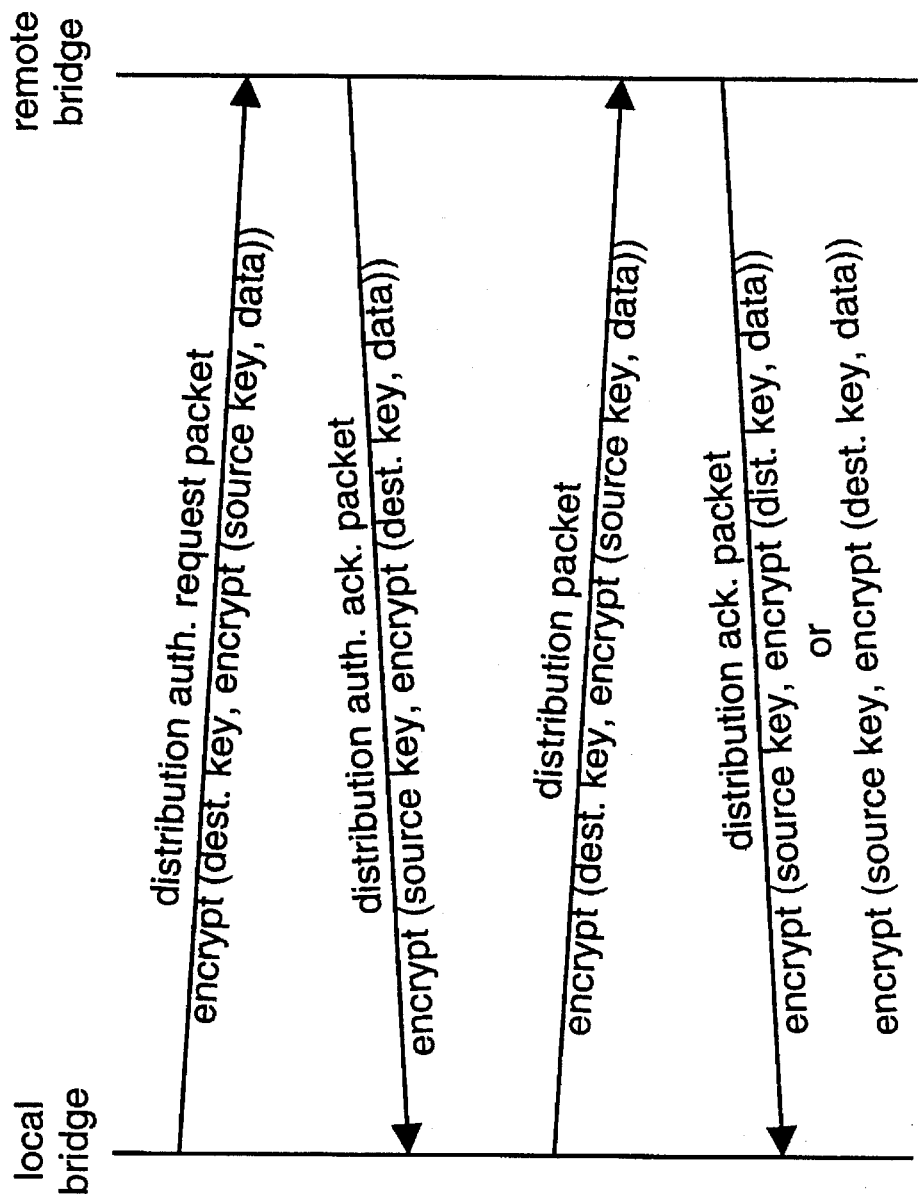
FIG. 13 shows the protocol for distribution of an item installed in the network security bridge of FIG. 2.

Referring to FIGS. 2 and 13, after an item is installed, the local bridge's bridge manager generates a distribution authorization request packet. It contains the ethernet and IP addresses of the local bridge as the ethernet and IP source addresses of the packet and the IP address of the remote bridge to which the installed item is to be distributed as the IP destination address of the packet. If the installed item is to be distributed to remote bridge 104-2, then the ethernet destination address of the packet is the ethernet address of bridge 104-2. But, if the installed item is to be distributed to remote bridge 104-3, then the ethernet destination address is the ethernet address of gateway 106. The distribution authorization request packet also includes an IP data frame that contains a distribution authorization request packet identifier, the user's i.d., the user's password for accessing the remote bridge to which the installed item is to be distributed.

The local bridge's bridge manager then stores the distribution authorization request packet in the side 2 buffer memory 202-2. It then selects from the key table 232 the source and destination keys corresponding to the remote bridge to which the packet is to be sent. It then calls up the encryptor/decryptor 233 and passes to it the pointer to the stored distribution packet. The IP data frame of the distribution authorization request packet is then encrypted first with the selected source key and then again with the selected destination key by the encryptor/decryptor in a similar manner to that described earlier for a normal data packet.

The local bridge's bridge manager then alerts the operating system 210 that the distribution authorization packet has been generated and passes to it the pointer to this packet. The packet is then transmitted by the local bridge in a manner similar to that described earlier for a normal data packet.

The remote bridge to which the installed item is to be distributed then receives the distribution authorization request packet in the manner described earlier. In the case of remote bridge 104-3, the packet is received from gateway 106 and has the ethernet source address of the gateway 106 and the ethernet destination address of the remote bridge 104-3. After the pointer to where the packet is being stored in the remote bridge's buffer memory 202-2 is placed in the remote bridge's bridge management packet receive queue 226-2, the remote bridge's operating system 210 calls up the remote bridge's bridge manager and passes the pointer to it.

Using the provided pointer, the remote bridge's bridge manager then parses the IP source address of the distribution authorization request packet and selects from the remote bridge's key table 232 the source and destination keys corresponding to the local bridge. The remote bridge's bridge manager then calls up the remote bridge's encryptor/decryptor 233 and passes to it the pointer to the stored packet. The IP data frame of the stored packet is then decrypted first with the selected destination key and then again with the selected source key by the remote bridge's encryptor/decryptor in a similar manner to that described earlier for a normal data packet.

The remote bridge's bridge manager then uses the provided pointer to parse from the stored distribution authorization request packet the distribution authorization request identifier, the user i.d., and the password for accessing the remote bridge. From these parsed items and the remote bridge's authorization table 246, the remote bridge's bridge manager determines if the user is authorized to distribute the installed item to the remote bridge in a similar manner to that described for determining whether the user is authorized to access the local bridge.

The remote bridge's bridge manager then generates a distribution authorization acknowledgment packet. It contains the ethernet and IP addresses of the remote bridge as the ethernet and IP source addresses of the packet and the IP address of the local bridge as the IP destination address of the packet. The ethernet destination address of the packet is the ethernet address of the local bridge if the remote bridge is bridge 104-2. But, if the remote bridge is bridge 104-3, then the ethernet destination address is the ethernet address of gateway 106. It also includes an IP data frame that contains a distribution authorization acknowledge packet identifier and acknowledgement information indicating whether or not the user has been authorized to distribute the installed item. The distribution authorization acknowledgement packet is then encrypted and transmitted by the remote bridge in a similar manner to that described earlier for the distribution authorization request packet.

The local bridge then receives and decrypts the distribution authorization acknowledgement packet in a similar manner to that described earlier for the distribution authorization request packet. Using the provided pointer to where the distribution authorization acknowledgement packet is stored in the local bridge's buffer memory 202-2, the local bridge's bridge manager parses the acknowledgment information to determine if the user has been authorized to distribute the installed item. If the user is not authorized, then the distribution operation must be attempted again.

If the user is authorized, then local bridge's bridge manager generates a distribution packet. It contains the same ethernet and IP source and destination addresses as does the distribution authorization request packet. It also includes an IP data frame that contains a distribution packet identifier, the item being distributed, and installment information identifying the location in the remote bridge's library 216 where the item being distributed is to be installed. The distribution packet is then encrypted and transmitted by the local bridge in a similar manner to that described earlier for the distribution authorization request packet.

The distribution packet is then received and decrypted by the remote bridge in a similar manner to that described for the distribution authorization request packet. The remote bridge's bridge manager then uses the provided pointer to where the packet is stored in the remote bridge's buffer memory 202-2 to parse the item being distributed and the installment information. The remote bridge's bridge manager then installs the parsed item using the parsed installment information and generates in response a distribution acknowledgement packet.

The distribution acknowledgement packet contains the same ethernet and IP source and destination addresses as the distribution authorization acknowledgement packet. It also includes an IP data frame that contains a distribution acknowledgement packet identifier and acknowledgement information indicating whether the item has been successfully distributed to the remote bridge. The distribution acknowledgement packet is then encrypted and transmitted by the remote bridge in a similar manner to that described for the distribution authorization acknowledgement packet. However, in this case, the first encryption is done with the distributed key.

The local bridge then receives and decrypts the distribution acknowledgement packet in a similar manner to that described for the distribution authorization acknowledgement packet, except that the second decryption is done with the distributed key. Using the provided pointer to where the packet is stored in the local bridge's buffer memory 202-2, the local bridge's bridge manager parses the acknowledgment information to determine that the item was successfully distributed.

BRIDGE REMOTE MANAGEMENT

Referring again to FIG. 2, bridge remote management involves installing or viewing one of the items contained in the library 216 of one of the remote bridges 104-2 or 104-3 using commands issued with the user terminal 246. The bridge remote management commands issued by the user contain (A) information indicating that an item is to be installed or viewed, (B) the user's i.d., (C) the user's password for accessing the local bridge 104-1 to install or view an item in the library 216 of a remote bridge, (D) installment or viewing information necessary for identifying the location in the remote bridge's library 216 of the item to be installed or viewed, and in the case of installing an item, (E) the item to be installed, and (F) the user's password for accessing the remote bridge to install the item.

The bridge remote management commands are received and processed by the local bridge in a similar manner to that described earlier for the bridge local management commands. Thus, from the information provided by the commands issued with the user terminal and the local bridge's authorization table 244, the local bridge's bridge manager determines if the user is authorized to access the local bridge to perform the bridge remote install or view operation.

Figure 14:
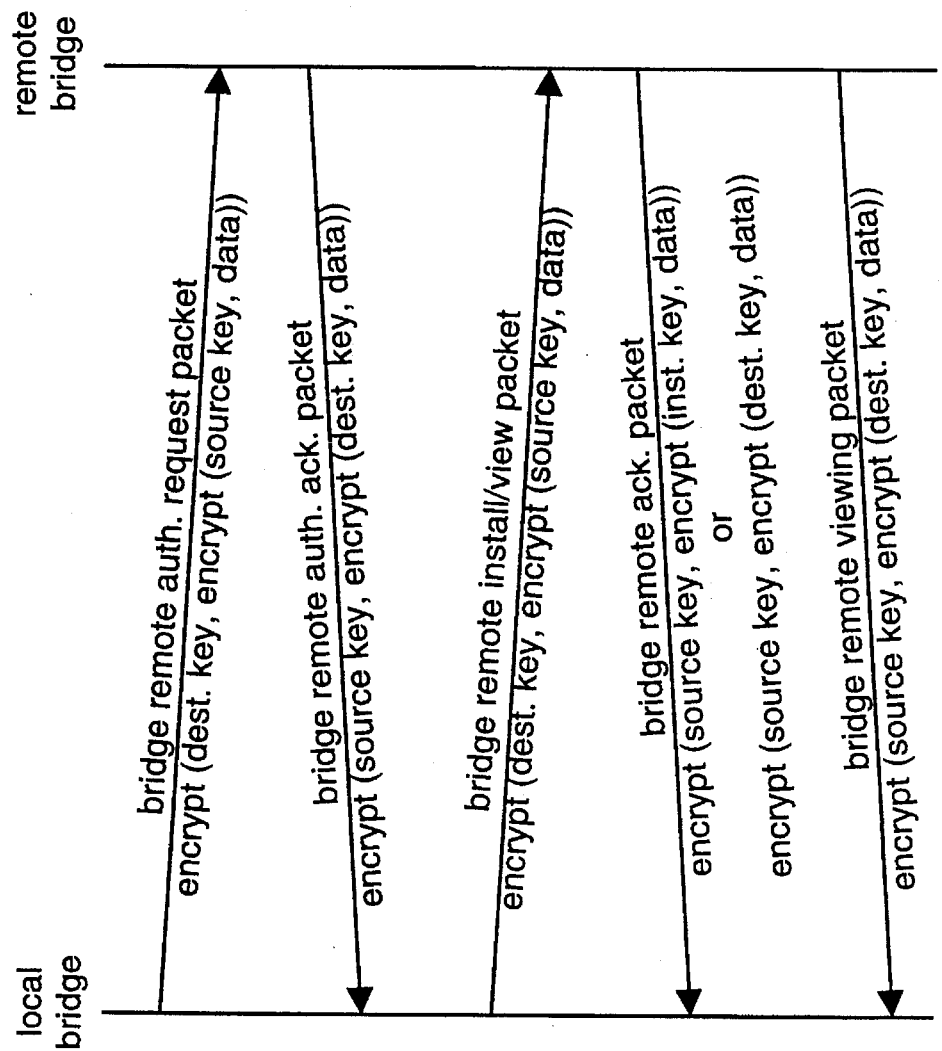
FIG. 14 shows the protocol for installing or viewing an item in a network remote security bridge using the local terminal of the network security bridge of FIG. 2.

Turning to FIGS. 2 and 14, if the user is authorized, then the local bridge's bridge manager generates a bridge remote install/view authorization request packet. It contains the ethernet and IP addresses of the local bridge as the ethernet and IP source addresses of the packet and the IP address of the remote bridge in which the item is to be installed or viewed. The ethernet destination address of the packet is the ethernet address of bridge 104-2 if the item is to be installed in or viewed in remote bridge 104-2. But, if the installed item is to be installed or viewed in remote bridge 104-3, then the ethernet destination address is the ethernet address of gateway 106. The packet also includes an IP data frame that contains a bridge remote install/view authorization request packet identifier, the user's i.d., and the user's password for accessing the remote bridge to install or view an item. The bridge remote install/view authorization request packet is then encrypted and transmitted in a manner similar to that described earlier for the distribution authorization request packet.

The remote bridge in which the item is to be installed or viewed then receives and decrypts the bridge remote install/view authorization request packet in a manner similar to that described for the distribution authorization request packet. It also determines if the user is authorized to install or view the item in this remote bridge in a manner similar to that described earlier for the distribution authorization request packet.

The remote bridge's bridge manager then generates a bridge remote install/view authorization acknowledgment packet. It contains the ethernet and IP addresses of the remote bridge as the ethernet and IP source addresses of the packet and the IP address of the local bridge as the IP destination address of the packet. The ethernet destination address of the packet is the ethernet address of bridge 104-1 if the remote bridge is bridge 104-2. But, if the remote bridge is bridge 104-3, then the ethernet destination address is the ethernet address of gateway 106. It also includes an IP data frame that contains a bridge remote install/view authorization acknowledge packet identifier and acknowledgement information indicating whether or not the user has been authorized to install or view the item. The bridge remote install/view authorization acknowledgement packet is then encrypted and transmitted by the remote bridge in a similar manner to that described earlier for the distribution authorization request packet.

The local bridge then receives and decrypts the bridge remote install/view authorization acknowledgement packet in a similar manner to that described earlier for the distribution authorization request packet. It also determines if the user has been authorized to install or view the item in a similar manner to that described earlier for the distribution authorization acknowledgement packet. If the user is not authorized, then the bridge remote install or view operation must be attempted again.

If the user is authorized, then local bridge's bridge manager generates a bridge remote install/view packet. It contains the same ethernet and IP source and destination addresses as does the bridge remote install/view authorization request packet. It also includes an IP data frame that contains a bridge remote install/view packet identifier, the installment or viewing information necessary for identifying the location in the remote bridge's library 216 of the item to be installed or viewed, and in the case of installing an item, the item to be installed. The bridge remote install/view packet is then encrypted and transmitted by the local bridge in a similar manner to that described earlier for the distribution authorization request packet.

The bridge remote install/view packet is then received and decrypted by the remote bridge in a similar manner to that described earlier for the distribution authorization request packet. The remote bridge's bridge manager then uses the provided pointer to where the packet is stored in the remote bridge's buffer memory 202-2 to parse the installment or viewing information and, in the case of an item being installed, the item to be installed.

When an item is being installed, the remote bridge's bridge manager installs the parsed item in the remote bridge's library 216 using the parsed installment information and generates in response a bridge remote installment acknowledgement packet. This packet contains an installment acknowledgement packet identifier and acknowledgement information indicating whether the item has been successfully installed in the remote bridge.

When an item is being viewed, the remote bridge's bridge manager retrieves the item to be viewed from the remote bridge's library 216 using the parsed viewing information and generates in response a bridge remote viewing packet. This packet contains a viewing packet identifier and the retrieved item.

Both the bridge remote installment acknowledgement packet and the bridge remote viewing packet contain the same ethernet and IP source and destination addresses as the bridge remote install/view authorization acknowledgement packet.

The bridge remote installment acknowledgement packet or viewing packet is then encrypted and transmitted by the remote bridge in a similar manner to that described earlier for the distribution authorization acknowledgement packet. However, in the case of the installment acknowledgement packet, the first encryption is done with the installed key.

The local bridge then receives and decrypts the bridge remote installment acknowledgement packet or viewing packet in a similar manner to that described earlier for the distribution authorization acknowledgement packet. But, in the case of the bridge remote installment acknowledgement packet, the second decryption is done with the installed key.

In the case of the bridge remote viewing packet, the local bridge's bridge manager parses the retrieved item using the provided pointer to where the packet is stored in the local bridge's buffer memory 202-2. Then, the local bridge's bridge manager generates a viewing signal containing the retrieved item which is sent from the CPU 204 to the serial interface 248. At the same time, the local bridge's bridge manager alerts the operating system 210 which calls up the serial interface driver 250. The serial interface driver then instructs the serial interface to send the signal to the user terminal 246 which displays the retrieved item for viewing by the user.

In the case of the bridge remote installment acknowledgement packet, the local bridge's bridge manager parses the acknowledgment information to determine that the item was successfully installed using the provided pointer to where the packet is stored in the local bridge's buffer memory 202-2. Once this is done, the local bridge distributes the installed item in the manner described earlier.

NETWORK LOCAL MANAGEMENT

Referring to FIG. 2, network local bridge management involves installing or viewing one of the items contained in the library 216 of local bridge 104-1 using one of the local secure zone hosts 102-1 or 102-2.

Figure 15:
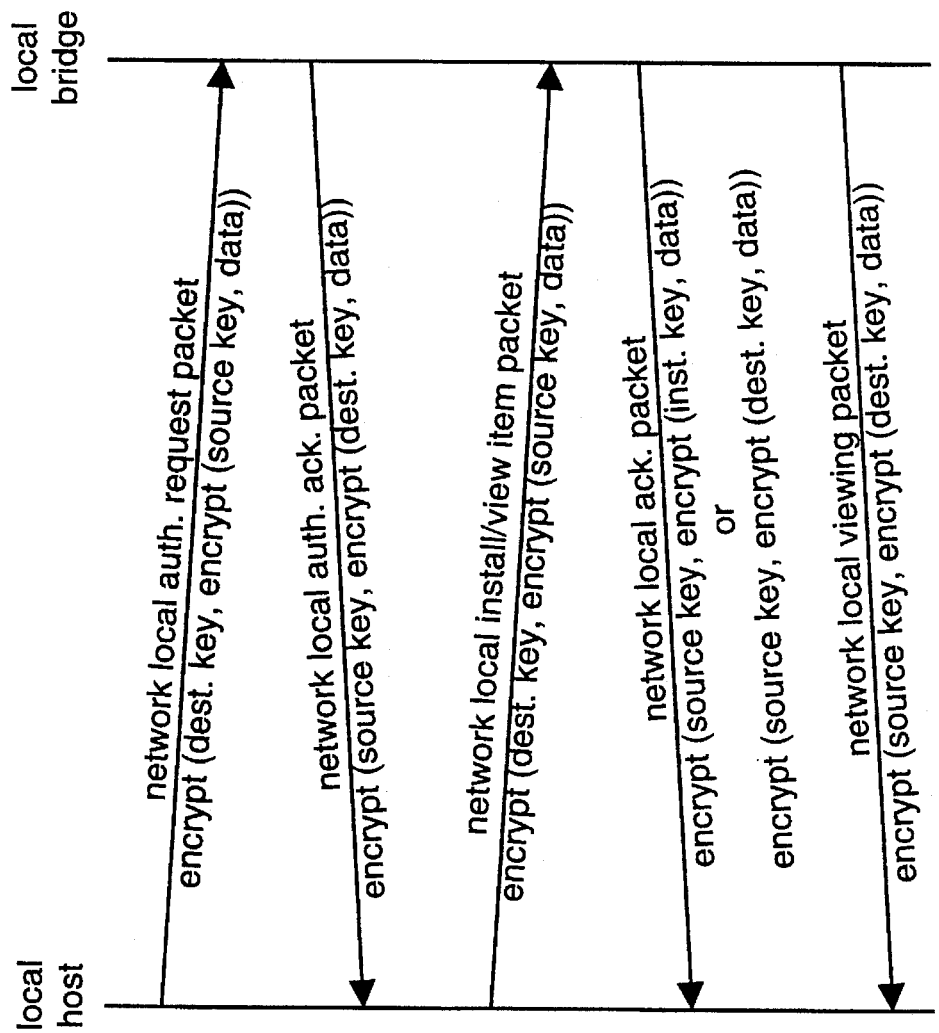
FIG. 15 shows the protocol for installing or viewing an item in the network security bridge of FIG. 2 using a host device.

As shown in FIG. 15, in order to do so, the user generates with a local secure zone host a network local install/view authorization request packet. It contains the ethernet and IP addresses of the local secure zone host as the ethernet and IP source addresses of the packet and the ethernet and IP addresses of local bridge 104-1 as the ethernet and IP destination addresses of the packet. The packet also includes an IP data frame that contains a network local install/view authorization request packet identifier, the user's i.d., and the user's password for accessing the local bridge to install or view an item. The network local install/view authorization request packet is then transmitted by the local secure zone host.

The local bridge then receives the network local install/view authorization request packet in a manner similar to that described for the distribution authorization request packet. It also determines if the user is authorized to install or view the item in the local bridge in a manner similar to that described earlier for determining from the distribution authorization request packet if the user is authorized to distribute an item to a remote bridge.

The local bridge's bridge manager then generates a network local install/view authorization acknowledgment packet. It contains the ethernet and IP addresses of the local bridge as the ethernet and IP source addresses of the packet and the ethernet and IP address of the local secure zone host as the ethernet and IP destination addresses of the packet. It also includes an IP data frame that contains a network local install/view authorization acknowledge packet identifier and acknowledgement information indicating whether or not the user has been authorized to install or view the item. The network local install/view authorization acknowledgement packet is then transmitted by the local bridge in a similar manner to that described earlier for the distribution authorization request packet.

The local secure zone host then receives the network local install/view authorization acknowledgement packet. It also determines if the user has been authorized to install or view the item in a similar manner to that described earlier for the distribution authorization acknowledgement packet. If the user is not authorized, then the network local install or view operation must be attempted again.

If the user is authorized, then the local secure zone host generates a network local install/view packet. It contains the same ethernet and IP source and destination addresses as does the network local install/view authorization request packet. It also includes an IP data frame that contains a network local install/view packet identifier, the installment or viewing information necessary for identifying the location in the local bridge's library 216 of the item to be installed or viewed, and in the case of installing an item, the item to be installed. The network local install/view packet is then transmitted by the local secure zone host.

The network local install/view packet is then received by the local bridge in a similar manner to that described earlier for the distribution authorization request packet. The local bridge's bridge manager then uses the provided pointer to where the packet is stored in the local bridge's buffer memory 202-2 to parse the installment or viewing information and, in the case of an item being installed, the item to be installed.

When an item is being installed, the local bridge's bridge manager installs the parsed item in the local bridge's library 216 using the parsed installment information and generates in response a network local installment acknowledgement packet. This packet contains a network local installment acknowledgement packet identifier and acknowledgement information indicating whether the item has been successfully installed in the remote bridge.

When an item is being viewed, the remote bridge's bridge manager retrieves the item to be viewed from the remote bridge's library 216 using the parsed viewing information and generates in response a network local viewing packet. This packet contains a network local viewing packet identifier and the retrieved item.

Both the network local installment acknowledgement packet and the network local viewing packet contain the same ethernet and IP source and destination addresses as the network local install/view authorization acknowledgement packet.

The installment acknowledgement packet or viewing packet is then transmitted by the local bridge in a similar manner to that described earlier for the distribution authorization acknowledgement packet.

The local secure zone host then receives the network local installment acknowledgement packet or viewing packet. In the case of the viewing packet, the local secure zone host displays the retrieved item for viewing by the user. In the case of the installment acknowledgement packet, the local secure zone host determines from the acknowledgment information that the item was successfully installed and local bridge distributes the installed item in the manner described earlier.

NETWORK REMOTE MANAGEMENT

Figure 16:
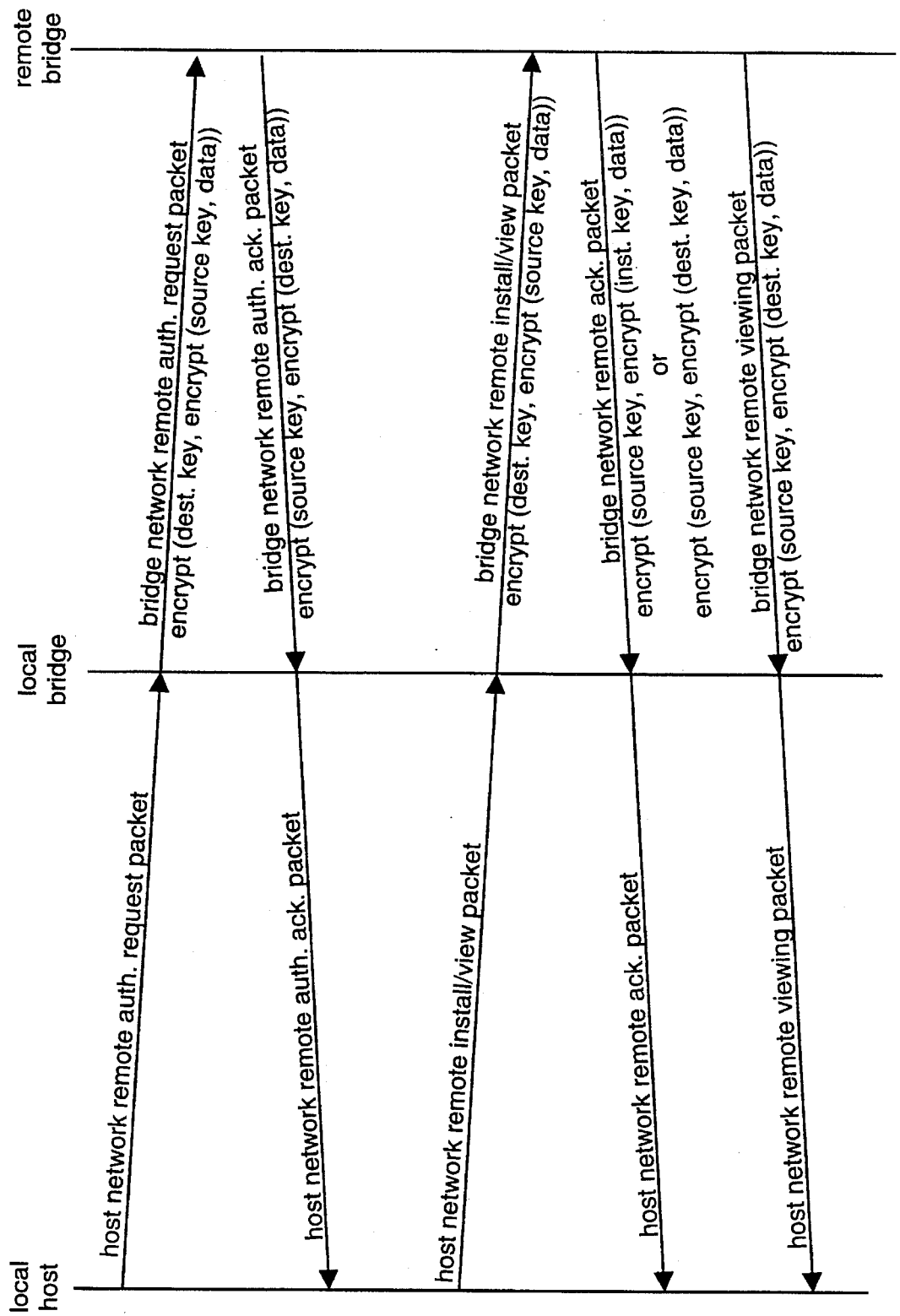
FIG. 16 shows the protocol for installing or viewing an item in a network remote security bridge using a host device to access the network security bridge of FIG. 2.

Referring to FIGS. 2 and 16, network remote bridge management involves installing or viewing one of the items contained in the library 216 of one of the remote bridges 104-2 or 104-3 using one of the local secure zone hosts 102-1 or 102-2.

This occurs when the user first generates with a local secure zone host a host network remote install/view authorization request packet. It contains the ethernet and IP addresses of the local secure zone host as the ethernet and IP source addresses of the packet and the ethernet and IP addresses of local bridge 104-1 as the ethernet and IP destination addresses of the packet. The packet also includes an IP data frame that contains a host network remote install/view authorization request packet identifier, the user's i.d., and the user's password for accessing the local bridge, and the user's password for accessing the remote bridge in which the item is to be installed or viewed. The host network remote install/view authorization request packet is then transmitted by the local secure zone host to the local bridge.

The local bridge then receives the host network remote install/view authorization request packet in a manner similar to that described for the distribution authorization request packet. It also determines if the user is authorized to access the local bridge in a manner similar to that described earlier for determining from the distribution authorization request packet if the user is authorized to distribute an item to a remote bridge.

If the user is not authorized to access the local bridge, then the local bridge's bridge manager generates and transmits at this point a host network remote install/view authorization acknowledgment packet. Since this packet may also be generated at a later point in the protocol sequence, this packet will be discussed later.

If the user is authorized to access the local bridge, then the local bridge's bridge manager generates a bridge network remote install/view authorization request packet. It contains the ethernet and IP addresses of the local bridge as the ethernet and IP source addresses of the packet and the IP address of the remote bridge in which the item is to be installed or viewed as the IP destination address of the packet. The ethernet destination address of the packet is the ethernet address of bridge 104-2 if the item is to be installed or viewed in remote bridge 104-2. But, if the installed item is to be installed or viewed in remote bridge 104-3, then the ethernet destination address is the ethernet address of gateway 106. The packet also includes an IP data frame that contains the user's i.d. and the user's password for accessing the remote bridge which are parsed from the IP data frame of the host network local install/view authorization request packet.

The remote bridge in which the item is to be installed or viewed then receives and decrypts the bridge network remote install/view authorization request packet in a manner similar to that described for the distribution authorization request packet. It also determines if the user is authorized to install or view the item in this remote bridge in a manner similar to that described earlier for the distribution authorization request packet.

The remote bridge's bridge manager then generates a bridge network remote install/view authorization acknowledgment packet. It contains the ethernet and IP addresses of the remote bridge as the ethernet and IP source addresses of the packet and the IP address of the local bridge as the IP destination address of the packet. The ethernet destination address of the packet is the ethernet address of the local bridge 104-1 if the remote bridge is bridge 104-2. But, if the remote bridge is bridge 104-3, then the ethernet destination address is the ethernet address of gateway 106. It also includes an IP data frame that contains a bridge network remote install/view authorization acknowledge packet identifier and acknowledgement information indicating whether or not the user has been authorized to install or view the item. The bridge remote install/view authorization acknowledgement packet is then encrypted and transmitted by the remote bridge in a similar manner to that described earlier for the distribution authorization request packet.

The local bridge then receives and decrypts the bridge network remote install/view authorization acknowledgement packet in a similar manner to that described earlier for the distribution authorization request packet. It also determines if the user has been authorized to install or view the item in the remote bridge in a similar manner to that described earlier for the distribution authorization acknowledgement packet and then generates the earlier described host network remote install/view authorization acknowledgement packet.

The host network remote install/view authorization acknowledgement packet contains the ethernet and IP addresses of the local bridge as the ethernet and IP source addresses of the packet and the ethernet and IP address of the local secure zone host as the ethernet and IP destination addresses of the packet. It also includes an IP data frame that contains a host network remote install/view authorization acknowledge packet identifier and acknowledgement information indicating whether or not the user has been authorized to install or view the item. The network local install/view authorization acknowledgement packet is then transmitted by the local bridge in a similar manner to that described earlier for the distribution authorization request packet.

The local secure zone host receives the host network local install/view authorization acknowledgement packet. It also determines if the user has been authorized to install or view the item. If the user is not authorized, then the network remote install or view operation must be attempted again.

If the user is authorized, then the local secure zone host generates a host network remote install/view packet. It contains the same ethernet and IP source and destination addresses as does the host network remote install/view authorization request packet. It also includes an IP data frame that contains a host network remote install/view packet identifier, the installment or viewing information necessary for identifying the location in the remote bridge's library 216 of the item to be installed or viewed, and in the case of installing an item, the item to be installed. The host network remote install/view packet is then transmitted by the local secure zone host.

The host network remote install/view packet is then received by the local bridge in a similar manner to that described earlier for the distribution authorization request packet. The local bridge's bridge manager then parses the installment or viewing information necessary for identifying the location in the remote bridge's library 216 of the item to be installed or viewed, and in the case of installing an item, the item to be installed. The local bridge's bridge manager then generates a bridge network remote install/view packet that contains the same ethernet and IP source and destination addresses as does the bridge network remote install/view authorization request packet. It also includes an IP data frame that contains a bridge network remote install/view packet identifier and the parsed installment or viewing information, and in the case of installing an item, the parsed item to be installed. The bridge network remote install/view packet is then encrypted and transmitted by the local bridge in a similar manner to that described earlier for the distribution authorization request packet.

The bridge remote install/view packet is then received and decrypted by the remote bridge in a similar manner to that described earlier for the distribution authorization request packet. The remote bridge's bridge manager then uses the provided pointer to where the packet is stored in the remote bridge's buffer memory 202-2 to parse the installment or viewing information and, in the case of an item being installed, the item to be installed.

When an item is being installed, the remote bridge's bridge manager installs the parsed item in the remote bridge's library 216 using the parsed installment information and generates in response a bridge network remote installment acknowledgement packet. This packet contains a bridge network remote installment acknowledgement packet identifier and acknowledgement information indicating whether the item has been successfully installed in the remote bridge.

When an item is being viewed, the remote bridge's bridge manager retrieves the item to be viewed from the remote bridge's library 216 using the parsed viewing information and generates in response a bridge network remote viewing packet. This packet contains a bridge network remote viewing packet identifier and the retrieved item.

Both the bridge remote installment acknowledgement packet and the bridge remote viewing packet contain the same ethernet and IP source and destination addresses as the bridge network remote install/view authorization acknowledgement packet.

The bridge network remote installment acknowledgement packet or viewing packet is then encrypted and transmitted by the remote bridge in a similar manner to that described earlier for the distribution authorization acknowledgement packet. However, in the case of the installment acknowledgement packet, the first encryption is done with the installed key.

The local bridge then receives and decrypts the bridge network remote installment acknowledgement packet or viewing packet in a similar manner to that described earlier for the distribution authorization acknowledgement packet. But, in the case of the bridge remote installment acknowledgement packet, the second decryption is done with the installed key.

In the case of the bridge network remote viewing packet, the local bridge's bridge manager then parses the retrieved item to be viewed and generates a host network remote viewing packet. It contains the same ethernet and IP source and destination addresses as the host network remote install/view authorization acknowledgement packet. It also includes an IP data frame containing the parsed retrieved item to be viewed.

In the case of the bridge network remote installment acknowledgement packet, the local bridge's bridge manager then parses the acknowledgement information and generates a host network remote installment acknowledgement packet. It contains the same ethernet and IP source and destination addresses as the host network remote install/view authorization acknowledgement packet. It also includes an IP data frame containing the parsed acknowledgement information.

The installment acknowledgement packet or viewing packet is then transmitted by the local bridge in a similar manner to that described earlier for the distribution authorization acknowledgement packet.

The local secure zone host then receives the host network remote installment acknowledgement packet or viewing packet. In the case of the viewing packet, the local secure zone host displays the retrieved item for viewing by the user. In the case of the installment acknowledgement packet, the local secure zone host determines from the acknowledgment information that the item was successfully installed and the local bridge distributes the installed item in the manner described earlier.

VARIATIONS

The network local security bridge 104-1 has been described as using an encryptor/decryptor 233. The encryption and decryption functions performed by the encryptor/decryptor 233 could be performed with encryption/decryption hardware or software.

Furthermore, for illustration purposes, the network local security bridge 104-1 has been described in the context of an ethernet network utilizing ethernet and IP protocols. However, the network security bridge 104-1 may be implemented for use in other types of networks using other types of protocols.

In addition, the steps 400–446 of FIGS. 4a–4c have been presented in a particular order for ease in explaining the functions of bridge 104-1. However, those skilled in the art will recognize that these steps may be presented in a different order to accomplish the same functions.

Moreover, while the present invention has been described with reference to a few specific embodiments, the description is illustrative of the invention and is not to be construed as limiting the invention. Various other modifications may occur to those skilled in the art without departing from the true spirit and scope of the invention as defined by the appended claims.

What is claimed is:

1. A network local security bridge that bridges a first side of a network and a second side of the network, the first side of the network including local secure zone host devices within a local secure zone established by the network local security bridge, the second side of the network including network remote security bridges that each establish a remote secure zone and remote secure zone host devices within the remote secure zones, the network local security bridge comprising:

a first interface controller to receive from the first side of the network a first data packet that contains a source address, a destination address, and a data frame;

a second interface controller to receive from the second side of the network a second data packet that contains a source address, a destination address, and a data frame;

a data packet processor coupled to the first and second interface controllers to process the first and second data packets by encrypting the data frame of the received first data packet when the source address of the received first data packet specifies one of the local secure zone host devices and the destination address of the received first data packet specifies one of the remote secure zone host devices, and by decrypting the data frame of the received second data packet when the source address of the received second data packet specifies one of the remote secure zone host devices and the destination address of the received second data packet specifies one of the local secure zone host devices;

the second interface controller transmitting the processed first data packet to the second side of the network; and the first interface controller transmitting the processed second data packet to the first side of the network.

2. A network local security bridge as recited in claim 1 wherein the data packet processor includes:

a data library containing, for each remote secure zone host device, information identifying the network remote security bridge that establishes the remote secure zone within which it is contained, and containing keys that each correspond to one of the network remote security bridges;

a data packet forwarder to select one of the keys from the library for use in encrypting when the source address of the received first data packet specifies one of the local secure zone host devices and the destination address of the received first data packet specifies one of the remote secure zone host devices, the key selected for use in encrypting corresponding to the network remote security bridge that according to the information in the library establishes the remote secure zone containing the remote secure zone host device specified by the destination address of the received first data packet, and to select one of the keys from the library for use in decrypting when the source address of the received second data packet specifies one of the remote secure zone host devices and the destination address of the received second data packet specifies one of the local secure zone host devices, the key selected for use in decrypting corresponding to the network remote security bridge that according to the information in the library establishes the remote secure zone containing the remote secure zone host device specified by the source address of the received second data packet; and an encryptor/decryptor to encrypt the data frame of the first side data packet with the key selected for use in encrypting, and to decrypt the data frame of the second data packet with the key selected for use in decrypting.

3. A network local security bridge as recited in claim 1 wherein the data packet processor includes:

a data library containing, for each remote secure zone host device, information identifying the network remote security bridge that establishes the remote secure zone within which it is contained, and containing, for each network remote security bridge, a corresponding destination key and a corresponding source key;

a data packet forwarder to select one of the destination keys from the library when the source address of the received first data packet specifies one of the local secure zone host devices and the destination address of the received first data packet specifies one of the remote secure zone host devices, the selected destination key corresponding to the network remote security bridge that according to the information in the library establishes the remote secure zone containing the remote secure zone host device specified by the destination address of the received first data packet, and to select one of the source keys from the library when the source address of the received second data packet specifies one of the remote secure zone host devices and the destination address of the received second data packet specifies one of the local secure zone host devices, the selected source key corresponding to the network remote security bridge that according to the information in the library establishes the remote secure zone containing the remote secure zone host device specified by the source address of the received second data packet; and an encryptor/decryptor to encrypt the data frame of the received first data packet with the selected destination key, and to decrypt the data frame of the received second data packet with the selected source key.

4. A network local security bridge that bridges a first side of a network and a second side of the network, the first side of the network including local secure zone host devices within a local secure zone established by the network local security bridge, the second side of the network including unsecure host devices, network remote security bridges that each establish a remote secure zone, and remote secure zone host devices within the remote secure zones, the network local security bridge comprising:

a first interface controller to receive from the first side of the network a first data packet that contains a source address, a destination address, and a data frame;

a second interface controller to receive from the second side of the network a second data packet that contains a source address, a destination address, and a data frame;

a data packet processor coupled to the first and second interfaces to process the received first and second side data packets by encrypting the data frame of the received first data packet when the source address of the received first data packet specifies one of the local secure zone host devices and the destination address of the received first data packet specifies one of the remote secure zone host devices, by leaving unchanged the data frame of the received first data packet when the source address of the received first data packet specifies one of the local secure zone host devices and the destination address of the received first data packet specifies one of the unsecure host devices, by decrypting the data frame of the received second data packet when the source address of the received second data packet specifies one of the remote secure zone host devices and the destination address of the received second data packet specifies one of the local secure zone host devices, and by leaving unchanged the data frame of the received second data packet when the source address of the received second data packet specifies one of the unsecure host devices and the destination address of the received second data packet specifies one of the local secure zone host devices;

the second interface controller transmitting the processed first data packet to the second side of the network; and the first interface controller transmitting the processed second data packet to the first side of the network.

5. A network local security bridge as recited in claim 4 wherein the data packet processor includes:

a data library containing, for each remote secure zone host device, information identifying the network remote security bridge that establishes the remote secure zone within which it is contained, and containing keys that each correspond to one of the network remote security bridges;

a data packet forwarder to select one of the keys from the library for use in encrypting when the source address of the received first data packet specifies one of the local secure zone host devices and the destination address of the received first data packet specifies one of the remote secure zone host devices, the key selected for use in encrypting corresponding to the network remote security bridge that according to the information in the library establishes the remote secure zone containing the remote secure zone host device specified by the destination address of the received first data packet, and to select one of the keys from the library for use in decrypting when the source address of the received second data packet specifies one of the remote secure zone host devices and the destination address of the received second data packet specifies one of the local secure zone host devices, the key selected for use in decrypting corresponding to the network remote security bridge that according to the information in the library establishes the remote secure zone containing the remote secure zone host device having the predefined address specified by the source address of the received second data packet; and an encryptor/decryptor to encrypt the data frame of the first data packet with the key selected for use in encrypting, and to decrypt the data frame of the second data packet with the key selected for use in decrypting.

6. A network local security bridge as recited in claim 4 wherein the data packet processor includes:

a data library containing, for each remote secure zone host device, information identifying the network remote security bridge that establishes the remote secure zone within which it is contained, and containing for each network remote security bridge, a corresponding destination key and a corresponding source key;

a data packet forwarder to select one of the destination keys from the library when the source address of the received first data packet specifies one of the local secure zone host devices and the destination address of the received first data packet specifies one of the remote secure zone host devices, the selected destination key corresponding to the network remote security bridge that according to the information in the library establishes the remote secure zone containing the remote secure zone host device specified by the destination address of the received first data packet, and to select one of the source keys from the library when the source address of the received second data packet specifies one of the remote secure zone host devices and the destination address of the received second data packet specifies one of the local secure zone host devices, the selected source key corresponding to the network remote security bridge that according to the information in the library establishes the remote secure zone containing the remote secure zone host device specified by the source address of the received second data packet; and an encryptor/decryptor to encrypt the data frame of the received first data packet with the selected destination key, and to decrypt the data frame of the received second data packet with the selected source key.

7. A method of bridging a first side of a network and a second side of the network to establish a local secure zone, the first side of the network including local secure zone host devices within the local secure zone, the second side of the network including network remote security bridges that each establish a remote secure zone and remote secure zone host devices within the remote secure zones, the method comprising the steps of:

receiving from the first of the network a first data packet that contains a source address, a destination address, and a data frame;

receiving from the second of the network a second data packet that contains a source address, a destination address, and a data frame;

processing the received first and second data packets including the steps of:
encrypting the data frame of the received first data packet when the source address of the received first data packet specifies one of the local secure zone host devices and the destination address of the received first data packet specifies one of the remote secure zone host devices; and
decrypting the data frame of the received second data packet when the source address of the received second data packet specifies one of the remote secure zone host devices and the destination address of the received second data packet specifies one of the local secure zone host devices;

transmitting the processed first data packet to the second side; and transmitting the processed second data packet to the first side.

8. A method as recited in claim 7 further comprising the steps of:

providing a data library containing, for each remote secure zone host device, information identifying the network remote security bridge that establishes the remote secure zone within which it is contained, and keys that each correspond to one of the network remote security bridges;

the processing step further including the steps of:
selecting one of the keys from the library for encrypting when the source address of the received first data packet specifies one of the local secure zone host devices and the destination address of the received first data packet specifies one of the remote secure zone host devices, the key selected for encrypting corresponding to the network remote security bridge that according to the information in the library establishes the remote secure zone containing the remote secure zone host device specified by the destination address of the received first data packet; and
selecting one of the keys from the library for decrypting when the source address of the received second data packet specifies one of the remote secure zone host devices and the destination address of the received second data packet specifies one of the local secure zone host devices, the key selected for decrypting corresponding to the network remote security bridge that according to the information in the library establishes the remote secure zone containing the remote secure zone host device specified by the source address of the received second data packet;

the encrypting step including the step of encrypting the data frame of the first data packet with the key selected for encrypting; and the decrypting step including the step of decrypting the data frame of the second data packet with the key selected for decrypting.

9. A method as recited in claim 7 further comprising the steps of:

providing a data library containing, for each remote secure zone host device, information identifying the network remote security bridge that establishes the remote secure zone within which it is contained, and containing, for each network remote security bridge, a corresponding destination key and a corresponding source key;

the processing step further including the steps of:
selecting one of the destination keys from the library when the source address of the received first data packet specifies one of the local secure zone host devices and the destination address of the received first data packet specifies one of the remote secure zone host devices, the selected destination key corresponding to the network remote security bridge that according to the information in the library establishes the remote secure zone containing the remote secure zone host device specified by the destination address of the received first data packet; and
selecting one of the source keys from the library when the source address of the received second data packet specifies one of the remote secure zone host devices and the destination address of the received second data packet specifies one of the local secure zone host devices, the selected source key corresponding to the network remote security bridge that according to the information in the library establishes the remote secure zone containing the remote secure zone host device specified by the source address of the received second data packet; and the encrypting step including the step of encrypting the data frame of the first data packet with the selected destination key; and the decrypting step including the step of decrypting the data frame of the second data packet with the selected source key.

10. A method of bridging a first side of a network and a second side of the network to establish a local secure zone, the first side of the network including local secure zone host devices within the local secure zone, the second side of the network including unsecure host devices, network remote security bridges that each establish a remote secure zone, and remote secure zone host devices within the remote secure zones, the method comprising the steps of:

receiving from the first side of the network a first data packet that contains a source address, a destination address, and a data frame;

receiving from the second side of the network a second data packet that contains a source address, a destination address, and a data frame;

processing the received first and second data packets including the steps of:

encrypting the data frame of the received first data packet when the source address of the received first data packet specifies one of the local secure zone host devices and the destination address of the received first data packet specifies one of the remote secure zone host devices; and leaving unchanged the data frame of the received first data packet when the source address of the received first data packet specifies one of the local secure zone host devices and the destination address of the received first data packet specifies one of the unsecure host devices;

decrypting the data frame of the received second data packet when the source address of the received second data packet specifies one of the remote secure zone host devices and the destination address of the received second data packet specifies one of the local secure zone host devices; and leaving unchanged the data frame of the received second data packet when the source address of the received second data packet specifies one of the unsecure host devices and the destination address of the received second data packet specifies one of the local secure zone host devices transmitting the processed first data packet to the second side; and transmitting the processed second data packet to the first side.

11. A method as recited in claim 10 further comprising the steps of:

providing a data library containing, for each remote secure zone host device, information identifying the network remote security bridge that establishes the remote secure zone within which it is contained, and containing keys that each correspond to one of the network remote security bridges;

the processing step including the steps of:

selecting one of the keys from the library for use in encrypting when the source address of the received first data packet specifies one of the local secure zone host devices and the destination address of the received first data packet specifies one of the remote secure zone host devices, the key selected for use in encrypting corresponding to the network remote security bridge that according to the information in the library establishes the remote secure zone containing the remote secure zone host device specified by the destination address of the received first data packet; and selecting one of the keys from the library for use in decrypting when the source address of the received second data packet specifies one of the remote secure zone host devices and the destination address of the received second data packet specifies one of the local secure zone host devices, the key selected for use in decrypting corresponding to the network remote security bridge that according to the information in the library establishes the remote secure zone containing the remote secure zone host device specified by the source address of the received second data packet; and the encrypting step including the step of encrypting the data frame of the first data packet with the key selected for use in encrypting; and the decrypting step including the step of decrypting the data frame of the second data packet with the key selected for use in decrypting.

12. A method as recited in claim 10 further comprising the steps of:

providing a library containing, for each remote secure zone host device, information identifying the network remote security bridge that establishes the remote secure zone within which it is contained, and containing, for each network remote security bridge, a corresponding destination key and a corresponding source key;

the processing step including the steps of:

selecting one of the destination keys from the library when the source address of the received first data packet specifies one of the local secure zone host devices and the destination address of the received first data packet specifies one of the remote secure zone host devices, the selected destination key corresponding to the network remote security bridge that according to the information in the library establishes the remote secure zone containing the remote secure zone host device specified by the destination address of the received first data packet; and selecting one of the source keys from the library when the source address of the received second data packet specifies one of the remote secure zone host devices and the destination address of the received second data packet specifies one of the local secure zone host devices, the selected source key corresponding to the network remote security bridge that according to the information in the library establishes the remote secure zone containing the remote secure zone host device specified by the source address of the received second data packet; and the encrypting step including the step of encrypting the data frame of the first data packet with the selected destination key; and the decrypting step including the step of decrypting the data frame of the second data packet with the selected source key.

* * * * *

UNITED STATES PATENT AND TRADEMARK OFFICE
CERTIFICATE OF CORRECTION

PATENT NO. : 5,548,649
DATED : August 20, 1996
INVENTOR(S) : JACOBSON, D. W., et al.

It is certified that error appears in the above-indentified patent and that said Letters Patent is hereby corrected as shown below:

On the title page, in item [73], insert --Inc.,-- after "Foundation".

In the specification, below the title, insert the paragraph --The U.S. Government may have certain rights in this invention pursuant to Grant No. ITA 87-02 from the U.S. Department of Commerce.--

Signed and Sealed this

Twenty-fifth Day of March, 1997

Attest:

BRUCE LEHMAN

*Attesting Officer*    Commissioner of Patents and Trademarks